(12) United States Patent
Hamid

(10) Patent No.: US 8,266,683 B2
(45) Date of Patent: Sep. 11, 2012

(54) AUTOMATED SECURITY PRIVILEGE SETTING FOR REMOTE SYSTEM USERS

(75) Inventor: Laurence Hamid, Ottawa (CA)

(73) Assignee: Imation Corp., Oakdale, MN (US)

( * ) Notice: Subject to any disclaimer, the term of this patent is extended or adjusted under 35 U.S.C. 154(b) by 1340 days.

(21) Appl. No.: 11/898,133

(22) Filed: Sep. 10, 2007

(65) Prior Publication Data

US 2008/0134314 A1 Jun. 5, 2008

Related U.S. Application Data

(60) Provisional application No. 60/842,946, filed on Sep. 8, 2006.

(51) Int. Cl.
*H04L 29/06* (2006.01)
(52) U.S. Cl. ............... 726/9; 726/26; 713/182
(58) Field of Classification Search .......... 726/9
See application file for complete search history.

(56) References Cited

U.S. PATENT DOCUMENTS

| | | | |
|---|---|---|---|
| 6,173,400 B1* | 1/2001 | Perlman et al. | 713/172 |
| 6,286,001 B1* | 9/2001 | Walker et al. | 707/697 |
| 2004/0078422 A1* | 4/2004 | Toomey | 709/202 |
| 2004/0225894 A1* | 11/2004 | Colvin | 713/200 |
| 2008/0028228 A1* | 1/2008 | Mardikar et al. | 713/184 |

FOREIGN PATENT DOCUMENTS

| | | |
|---|---|---|
| CA | 2358535 A1 | 7/2000 |
| WO | WO 01/61620 A1 | 8/2001 |
| WO | WO 2007/030517 A2 | 3/2007 |

OTHER PUBLICATIONS

ISA/CA, International Search Report mailed Dec. 10, 2007, Gatineau, Canada.
Anonymous, "Smart Dongle: Feeling at home. Everywhere." *Gemalto Telecommunications White Paper*; Feb. 2007, pp. 1-16.

* cited by examiner

*Primary Examiner* — Edward Zee
*Assistant Examiner* — Yogesh Paliwal
(74) *Attorney, Agent, or Firm* — Kenneth E. Levitt; Dorsey & Whitney LLP

(57) ABSTRACT

A method of secure communication involves determining that a remote system is trusted prior to authorizing secure communication therewith. A removable security device is coupled with a first system. When the first system communicates with a remote system securely, the remote system is evaluated to ensure that it is a trusted remote system prior to secure communication therewith being allowed.

52 Claims, 14 Drawing Sheets

AUTOMATED SECURITY PRIVILEGE SETTING FOR REMOTE SYSTEM USERS

FIELD OF THE INVENTION

The invention relates to the field of computer security and more particularly to establishing security based on access to a remote system.

BACKGROUND

With microcomputers becoming a ubiquitous part of communications, information storage, analysis and entertainment, the use of portable storage media is increasingly common. One application of portable storage media is computer security.

In using portable storage media such as smart cards, USB memory devices, key fobs, and portable hard drives for computer security, what is often done is that security processes are executed within the portable device for securing some aspect of computer functionality. A very common example is the "dongle." A dongle is a device that couples to a computer port for enabling execution of a software application. Many expensive software applications require a dongle in order to prevent piracy thereof.

Another example is a secure storage medium. Here, data access is restricted by the portable device until some user authentication is performed. This authentication is typically managed by the device itself. As such, security for these portable devices, when self managed, is assured across platforms and systems.

Today, many systems are networked to each other via a public network such as the Internet. With access to the Internet, comes access to a plethora of goods and services from banking to entertainment to shopping. Unfortunately, where there are financial transactions, there is also an opportunity for fraud.

There are two fundamental methods for defrauding consumers using the Internet. In the first, social engineering is employed to dupe an individual out of their hard earned money. For example, a non-existent product is sold and never shipped even though payment is received. Another form of socially engineered fraud involves asking a user for their password information in a fashion to encourage them to enter same. For example, a duplicate web site to that of a bank is presented with a login page. Once the user provides their information, the fraud is perpetrated by properly logging into the banking system. Since the proper credentials are provided—user name and password—it is impossible for the bank to prevent the fraud from occurring. In a second type of fraud, adware software is employed to retrieve from computer systems data for use in perpetrating the fraud. Here passwords and user names are retrieved, for example, using a key capture Trojan that logs each keystroke and sends the log file to the perpetrator. In order to avoid this second type of fraud, two common methods are employed. In the first, a security process is executed for maintaining a system free of ad ware and viruses. In a second method, one-time passwords (OTPs) are employed such that even with key logging, no useful information is captured.

It would be advantageous to provide a method for at least in part avoiding fraud of the above-mentioned types.

SUMMARY OF THE INVENTION

In accordance with the invention there is provided a method comprising: coupling a removable security device having therein a first security process to a first system; accessing a remote server system by at least one of the removable security device and the first system, the first remote system accessible via a network; when the first remote system is accessed, enabling the first security process to establish secure communications according to the first security process between the first system and the remote server system; and when the first remote system is other than accessible, other than enabling the first security process.

In accordance with another embodiment of the invention there is provided a method comprising: coupling a removable security device having therein a first security process to a first system; accessing a remote server system by at least one of the removable security device and an applet in execution within the first system and communicating with the removable security device, the first remote system accessible via a network; when the first remote system is accessed, enabling the first security process to establish secure communications according to the first security process between the first system and the remote server system; when the first remote system is other than accessed, preventing secure communication between the first system and the remote server system according to the first security process; and when the first remote system is accessed, performing the first security process to authenticate the security device to the remote server system, the first remote system then transmitting data to at least one of the first system and the remote server system to establish secure communications between the first system and remote server system.

In accordance with another embodiment of the invention there is provided a method comprising; coupling a removable security device having therein a first security process to a first system; accessing a first remote system by at least one of the removable security device and the first system, the first remote system accessible via a network; when the first remote system is accessed, enabling the first security process; and when the first remote system is other than accessible, other than enabling the first security process.

In accordance with another embodiment of the invention there is provided a storage medium having stored therein data, the data when executed resulting in a security method comprising; providing the coupling of a removable security device having therein a first security process to a first system; and accessing a first remote system by at least one of the removable security device and the first computer, the first remote system accessible via a network. When the first remote system is accessed, enabling the first security process; and when the first remote system is other than accessible, other than enabling the first security process.

In accordance with another embodiment of the invention there is provided a storage medium having stored therein data which when executed results in a security method comprising; providing a coupling of a removable security device having therein a first security process to a first system; loading from the removable security device an applet for execution, the applet for being loaded in response to coupling of the removable security device therewith, the applet for accessing the first remote system. Accessing a first remote system by at least one of the removable security device and the first system, the first remote system accessible via a network; wherein when the first remote system is accessed, enabling the first security process; and when the first remote system is other than accessible, other than enabling the first security process.

In accordance with another embodiment of the invention there is provided a method of security comprising determining access privileges to at least one of data and processes within a removable security device. The access privileges determined by communicating with a remote system; exchanging security data between the security device and the remote system; and in dependence upon the security data exchanged, determining access privileges to at least one of data and processes within the removable security device.

BRIEF DESCRIPTION OF THE DRAWINGS

Exemplary embodiments of the invention will now be described in conjunction with the following drawings, in which:

FIG. 7 outlines an exemplary flow diagram for wherein the access privileges of user are determined by the establishment of communication to remote computer system and the identity of the computer the user is accessing from.

FIG. 11 outlines an exemplary flow diagram for wherein the access privileges of user are established via an applet loaded for establishing communication to remote computer systems and the identity of the computer the user is accessing them from.

DETAILED DESCRIPTION OF EMBODIMENTS OF THE INVENTION

Figure 1:
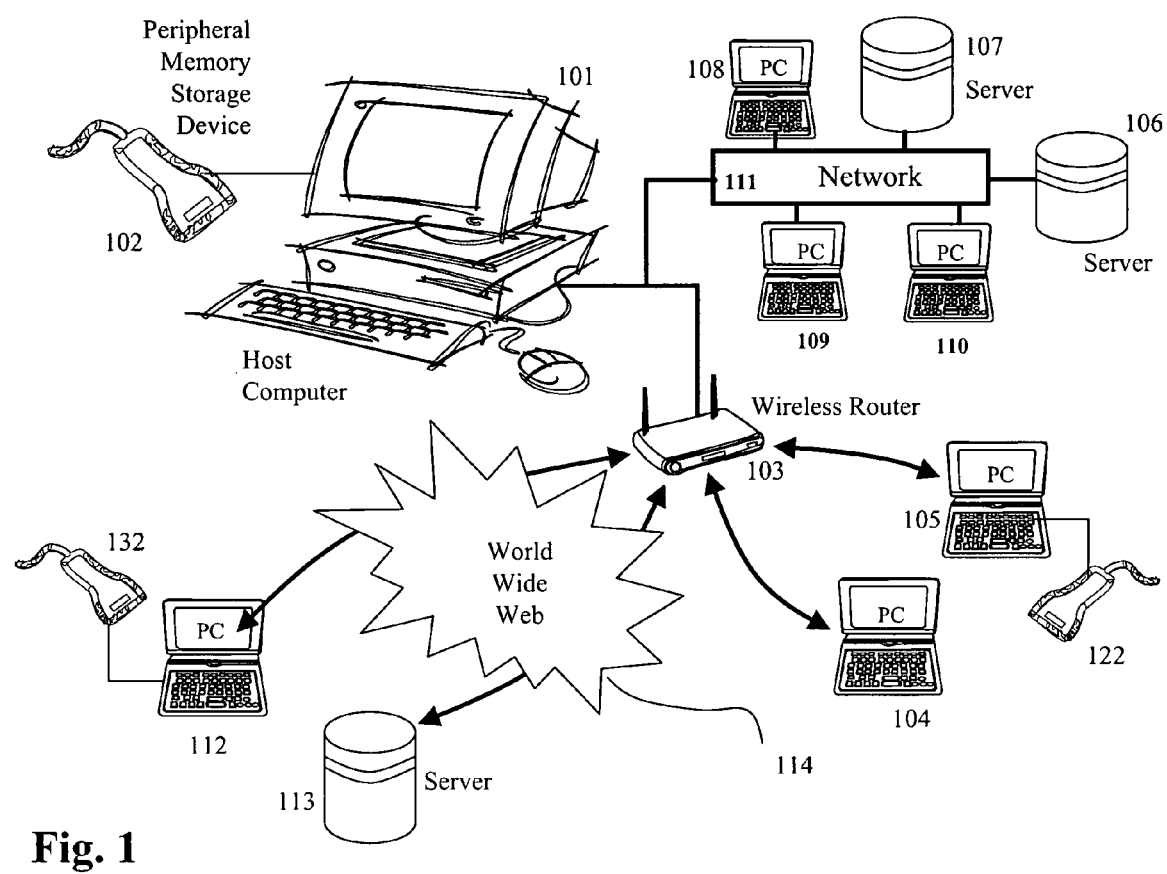
FIG. 1 illustrates a simplified schematic of a host computer with a peripheral memory storage device coupled thereto and networked for accessing multiple remote computer systems.

Referring to FIG. 1 shown is a simplified diagram illustrating a host computer system 101. Coupled with the host computer system is peripheral memory storage device 102. The peripheral memory storage device is capable of securing some functions either thereof or of the host computer system. Some examples of supported functions include encryption of data within the peripheral memory storage device 102, one time password generation by the peripheral memory storage device 102, and secure communication negotiation by the peripheral memory storage device 102. For example, in order to provide a security function for an application, the host computer system 101 loads an applet from the peripheral memory storage device 102 for performing a security function thereon. Here, the applet addresses the communications interfaces of the host computer 101 in order to access a communication network available thereto for communicating with the peripheral memory storage device 102.

Shown are a directly interconnected network 111 having a series of first computers 108, 109 and 110 along with first and second server systems 106, 107. Due to the direct interconnection of the network 111, its security is typically determined with ease. For example, when network 111 is within a highly secure environment the interconnects in the form of cabling comprise, for example, screened Ethernet cables. Further, security systems in the form of firewalls are interposed between the highly secure environment and a wide area network coupled therewith in the form of the World Wide Web 114.

Shown is a wireless router 103, which addresses second computer system 104 and third computer system 105 having a second portable memory storage device 122 coupled therewith. Optionally wireless router 103 also acts as a firewall for the network 111. Communication to the second and third computer systems 104 and 105 is typically considered less secure as the wireless link is subject to tapping and intercept.

The host computer system 101 interfaces with a wide area network in the form of the World Wide Web, or Internet, 114. Also shown interfacing to the World Wide Web are a fourth computer system 112 having a third portable memory storage device 132 coupled therewith and a third server 113. Communication to these systems is also typically less secure as the basic principles of the Internet allow the packets of information to be routed through any elements of the network. At any point of this wide information flow data is accessible for illegal monitoring, sampling, and copying.

Figure 2A:
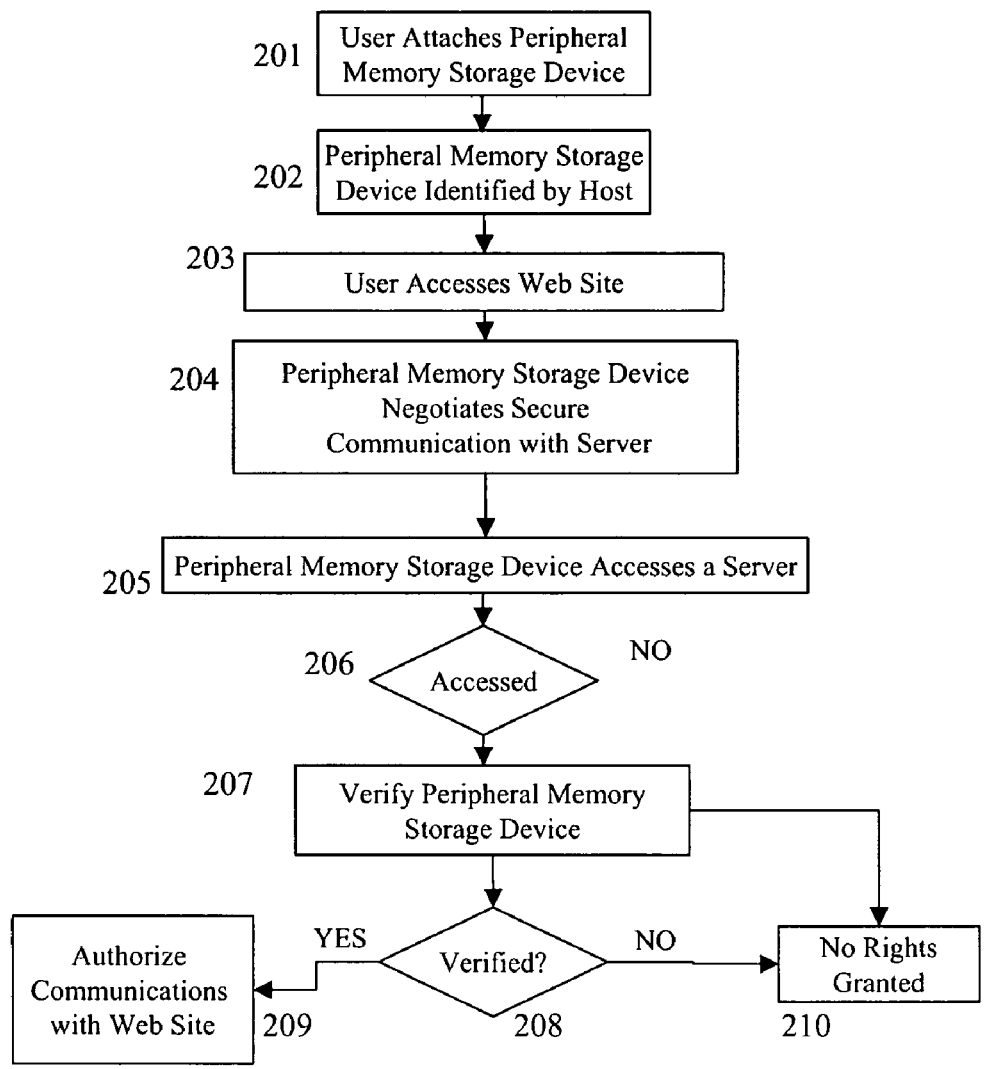
FIG. 2a is a simplified flow diagram of a method of securing access to a server relying on a password stored securely within the peripheral memory storage device.

Referring to FIG. 2a, shown is a simplified flow diagram of a method of securing access to a server relying on a password stored securely within the peripheral memory storage device 102. A user attaches the peripheral memory storage device 102 to a host computer system in step 201 wherein in step 202 the host computer system identifies the peripheral memory storage device. The user, using the host computer system, accesses a secure web site such as banking or trading web site in step 203. The host computer negotiates a secure connection with the secure website for conducting communications, in this example financial transactions, as shown in step 204 in conjunction with the peripheral memory storage device.

The peripheral memory storage device 102 via an applet in execution within the host computer system accesses a server in step 205, the server at a predetermined location within the network and verifies itself to the server. If the server is not accessed in step 206 then the process moves to step 210 and no rights are granted. If the server is accessed in step 206 then the applet also acts to verify the peripheral memory storage device to the server, in step 207. A verification decision being made in step 208. If the peripheral memory storage device is not verified then the process moves to step 210 and ends. Once verification is complete, the user has access to communications with the secure web site in step 209.

As is evident to those of skill in the art, a spoof web site displayed to a user to acquire their credentials will not breach security or successfully gather credentials as they are provided to a predetermined server directly from the peripheral memory storage device 102. As such, the user is less capable of undermining security due to a fraud based on social engineering as (a) they may be unaware of their own credentials—user name and password and (b) the credentials are not provided to any web site—they are only provided to predetermined servers. In this fashion, if a bank provides the peripheral memory storage device 102 to the user, the bank maintains control of their security passwords, processes, and servers to result in a higher level of security.

Figure 2B:
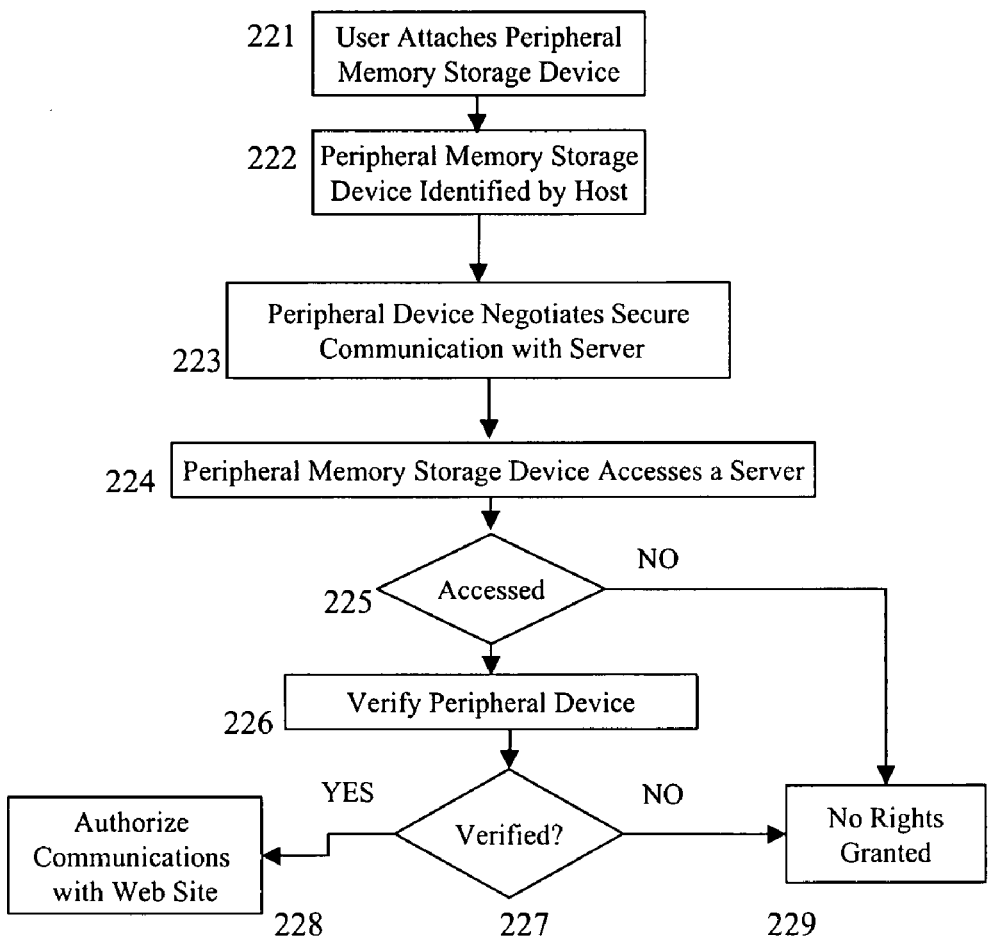
FIG. 2b is a simplified flow diagram of a method of securing access to a server relying on a password stored securely within the peripheral memory storage device.

The flow diagram of FIG. 2b is a simplified diagram of a process similar to that of FIG. 2a wherein the peripheral device negotiates the secure communication with the server. A user attaches the peripheral memory storage device 102 to a host computer system in step 221 wherein in step 222 the host computer system identifies the peripheral memory storage device. Unlike the flow diagram presented supra in FIG. 2A the peripheral device negotiates a secure connection with the secure website for conducting communications, in this example financial transactions, as shown in step 223.

The peripheral memory storage device 102 via an applet in execution within the host computer system accesses a server in step 224, the server at a predetermined location within the network and verifies itself to the server. If the server is not accessed in step 2225 then the process moves to step 229 and no rights are granted. If the server is accessed in step 225 then the applet also acts to verify the peripheral memory storage device to the server, in step 226. A verification decision being made in step 228. If the peripheral memory storage device is not verified then the process moves to step 229 and ends. Once verification is complete, the user has access to communications with the secure web site in step 228.

Figure 3A:
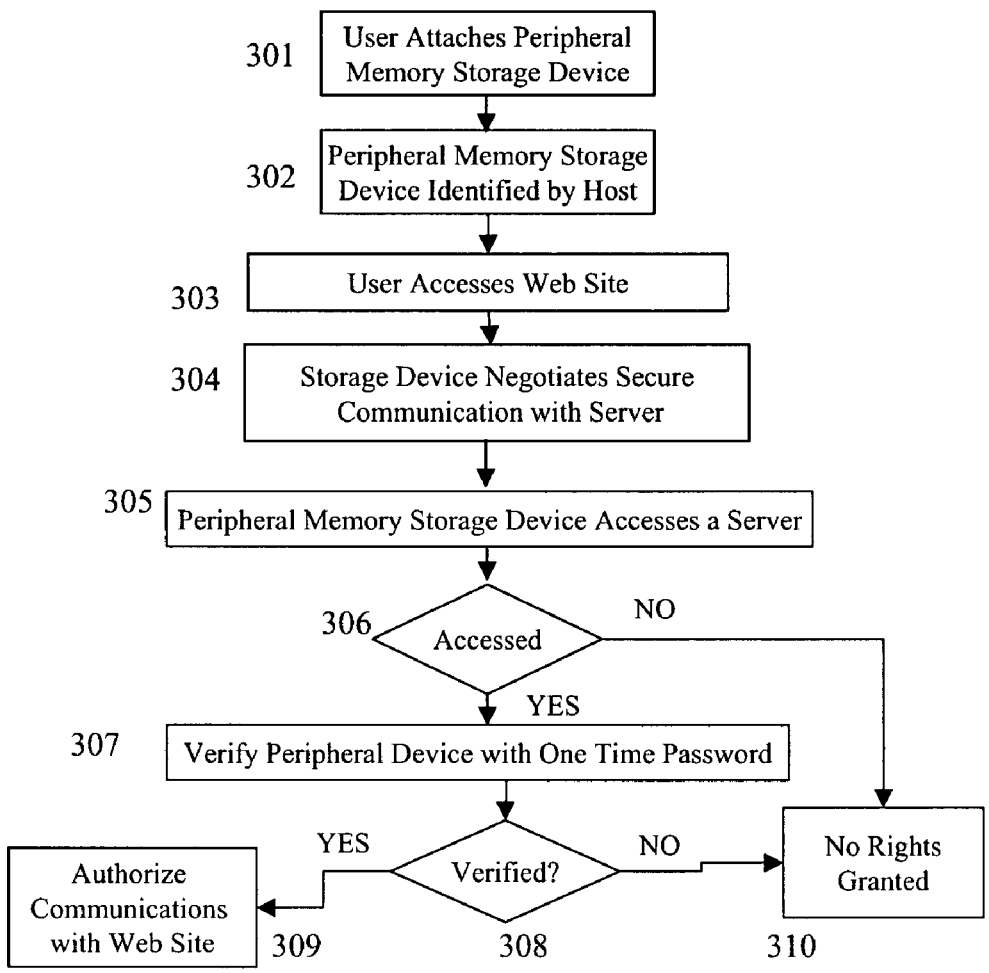
FIG. 3a is a simplified flow diagram of a method of securing access to a server relying on a one time password generated securely within the peripheral memory storage device.

Referring to FIG. 3a, shown is a simplified flow diagram of a method of securing access to a server relying on a one time password generated securely within the peripheral memory storage device 102. A user attaches the peripheral memory storage device 102 to a host computer system in step 301 whereupon it is identified by the host computer in step 302. The user, using the host computer system, accesses a secure web site such as banking or trading web site in step 303. The peripheral device negotiates a secure connection with the secure website for conducting communications, in this example financial transactions in step 304.

The peripheral memory storage device 102 via an applet in execution within the host computer system accesses a server, in step 305, at a predetermined location within the network. If the server is not accessed then the process moves to step 310, wherein no rights are granted. If the server is accessed in step 306 then the process moves to step 307 and a one time password is provided from the peripheral memory storage device to the server in verification step 307. If the peripheral device verifies itself to the server in step 308 the process moves to step 309 and communications to the server are authorized. However, a failed verification at step 308 results in the process moving to step 310, granting no rights and terminating the process. In an exemplary embodiment of step 307, the server at the predetermined network location provides a first value and the peripheral memory storage device, based on the received first value, generates a second other value as the one time password and provides this to the server. In this way, the password, even if intercepted, is of no predictable use in the future. Preferably, the one time password is obfuscated to ensure that the one time password is not useful at present or in the future, if intercepted.

As is evident to those of skill in the art, a spoof web site displayed to a user to acquire their credentials will not breach security or successfully gather credentials as they are provided to a predetermined server directly from the peripheral memory storage device 102. As such, the user is less capable of undermining security due to a fraud based on social engineering as (a) they are unaware of a next one time password and (b) the credentials are not provided to any web site selected by the user—they are only provided to one or more predetermined servers. Optionally, server public keys are stored within the peripheral memory storage device 102 in a reliable and secure fashion to ensure that network addresses of those servers are not spoofed. In this fashion, if a bank provides the peripheral memory storage device 102 to the user, the bank maintains control of their security password generating process, communication processes, and servers to result in a higher level of security.

Figure 3B:
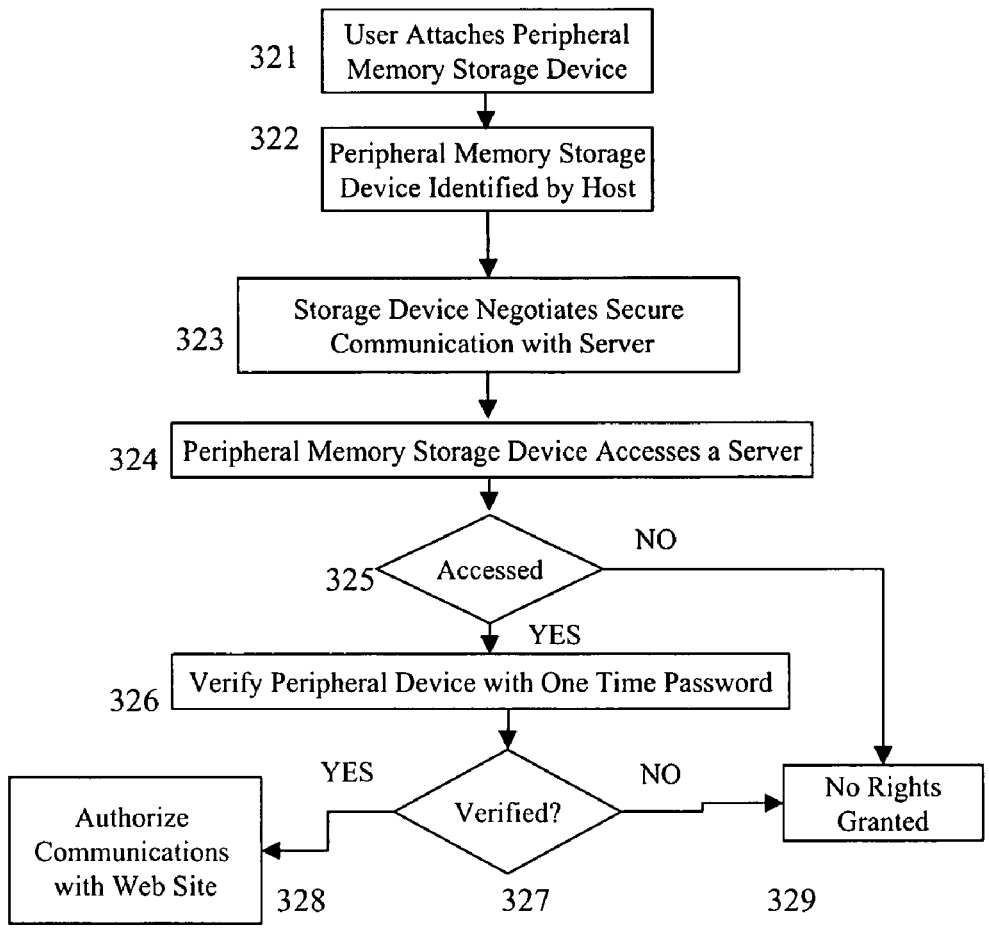
FIG. 3b is a simplified flow diagram of a method of securing access to a server relying on a one time password generated securely within the peripheral memory storage device.

The flow diagram of FIG. 3b is a simplified diagram of a process similar to that of FIG. 3a wherein the peripheral device negotiates the secure communication with the server. A user attaches the peripheral memory storage device 102 to a host computer system in step 321 whereupon it is identified by the host computer in step 322. The peripheral device automatically negotiates a secure connection with the secure website for conducting communications, in this example financial transactions in step 323. The peripheral memory storage device 102 via an applet in execution within the host computer system accesses a server, in step 324, at a predetermined location within the network. If the server is not accessed then the process moves to step 329, wherein no rights are granted. If the server is accessed in step 325 then the process moves to step 326 and a one time password is provided from the peripheral memory storage device to the server. If the peripheral device verifies itself to the server in step 327 the process moves to step 328 and communications to the server are authorized. However, a failed verification at step 327 results in the process moving to step 329, granting no rights and terminating the process.

Figure 4:
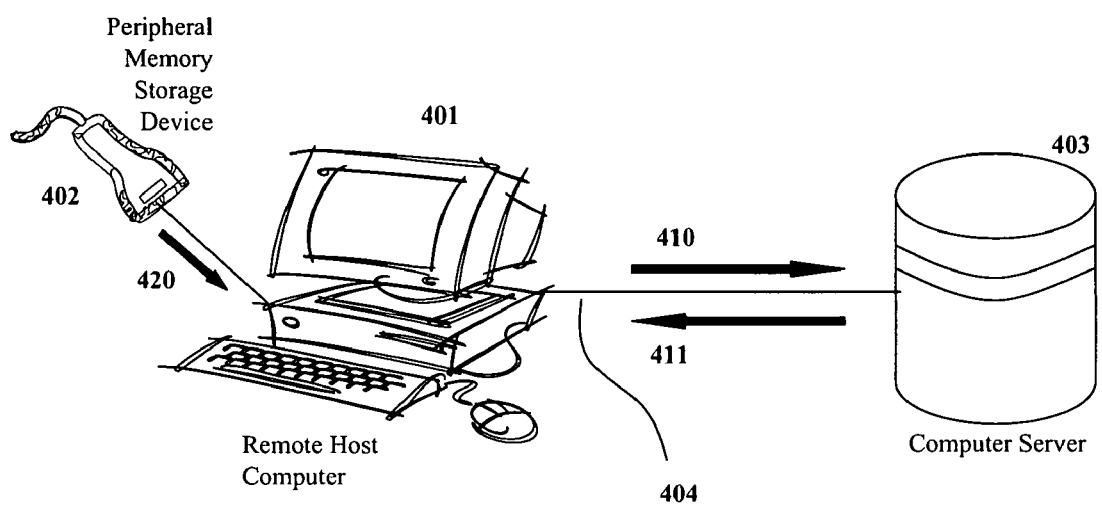
FIG. 4 illustrates an exemplary embodiment of the invention wherein a user possessing a removable peripheral memory storage device wishes to use a remote host computer to access a computer server, whose identity is securely stored on the removable peripheral memory storage device.

Shown in FIG. 4 is an exemplary embodiment of a system and method for use therewith wherein a user possessing a removable peripheral memory storage device 402 accesses a host computer 401 to access a computer server 403, an address of which is unknown to the user but is securely stored on the removable peripheral memory storage device 402.

The user accesses the remote host computer 401 for the purposes of accessing a software application and/or computer data from a corporate network, for example. The user couples the peripheral memory storage device 402 to the host computer 401. The peripheral memory storage device 402 is identified by the host computer system, and from it an applet and a set of one or more computer server addresses are extracted, depicted at 420. The host computer 401 executes the uploaded applet resulting in an attempt to communicate with a server 403 indicated by the address extracted from the peripheral memory storage device 402, the communication depicted at 410 and via communication path 404.

If the identified remote system is successfully contacted then the computer server 403 communicates via a security protocol at 411 for example, seeking verification of security data. Exemplary forms of security data include user provided data, security data embedded into the peripheral memory storage device, and biometric validation of the user. Optionally, the peripheral memory storage device also acts to verify the remote system. For example, the applet executes within the host system to verify integrity, security, and identity thereof. Once secured, the peripheral memory storage device communicates with the remote system via, for example, a registered private key or certificate stored securely within the peripheral memory storage device to verify that the server owns the private key via a signature verification of a message sent from the server. Once completed, the remote server is verified as trusted.

Once the security data is validated, the peripheral memory storage device is activated to provide enhanced functionality based on the validation. When the server is unreachable or when the security data is other than validated, the enhanced functionality is other than available. Optionally, the enhanced functionality includes providing user authorization data to the server to enable communications either between the remote host computer and the server or between the remote host computer and another server.

Figure 5:
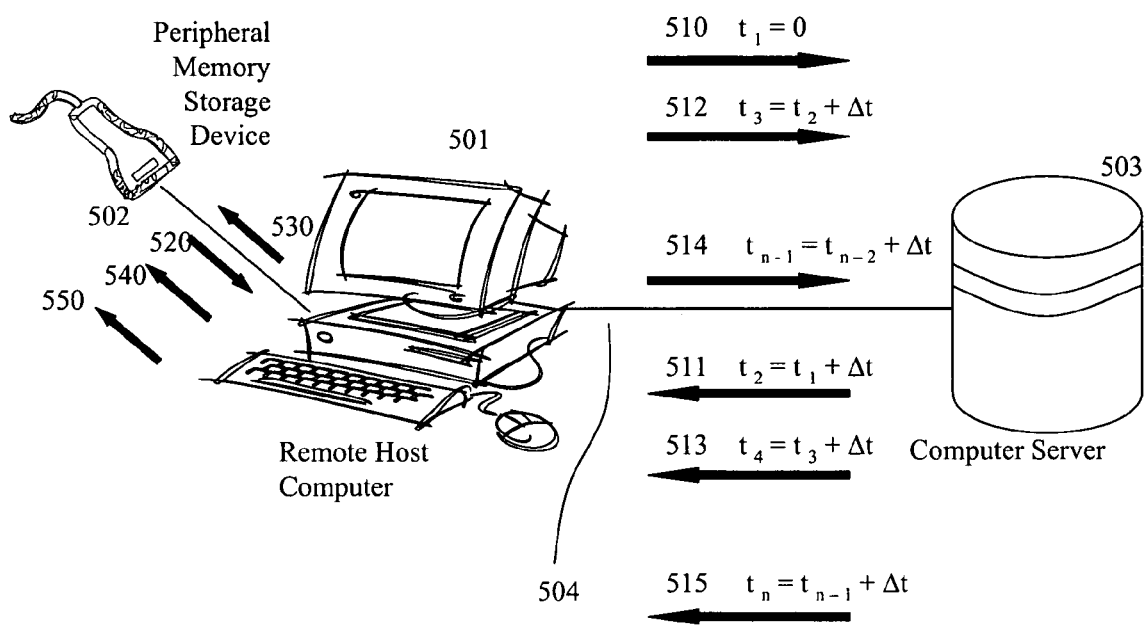
FIG. 5 illustrates an exemplary embodiment of the invention wherein a user possessing a removable peripheral memory storage device wishes to use a remote host computer to access a computer server, the server and host periodically re-verifying the security credentials of the user, which are securely stored on the removable peripheral memory storage device.

Referring to shown in FIG. 5 is an exemplary embodiment wherein a user possessing a removable peripheral memory storage device 502 wishes to use host computer 501 to access a remote computer server 503, the remote computer server 503 and host computer 501 periodically re-verifying the communication there between. In the exemplary embodiment the user couples the peripheral memory storage device 502 to the host computer 501. The removable peripheral memory storage device 502 is identified by the host computer 501, and from it an applet and a set of one or more remote computer server identities are extracted at first transfer 520. The host computer 501 executes the uploaded applet causing it to attempt to access one or more remote computer servers 503 based on the identifier(s) extracted from the removable peripheral memory storage device 502 and represented at first communication 510.

If the identified remote computer server 503 is successfully contacted, then the remote computer server 503 communicates via a security protocol, shown at second communication 511, for example, seeking verification of security data embedded into the peripheral memory storage device, shown as second transfer 530. Exemplary other forms of security data include user provided data, security data, and biometric validation of the user.

Once the security data is validated, the removable peripheral memory storage device 502 is activated to provide enhanced functionality based on the validation. Alternatively, once the security data is validated, the server is activated to provide enhanced functionality based on the validation. Further alternatively, once the security data is validated, another server that is in communication with the server is activated to provide enhanced functionality based on the validation. When the server is unreachable or when the security data is other than validated, the enhanced functionality is other than available.

After a prescribed period, denoted in the figure as $\Delta t$, the peripheral storage device requests at third communication 512 to establish a re-verification of the security data from the remote computer server 503. The third communication 512 causes the host computer 501 to communicate with the remote computer server 503, triggering fourth communication 513 and third transfer 540. The re-verification of the security data re-occurs for each incremental time period $\Delta t$ such that for the $N^{th}$ re-verification the elapsed time is $N*\Delta t$, where N is a positive integer, until either the re-verification process fails or the user logs out of the application or data access. Such an $N^{th}$ re-verification is shown by fifth and sixth communications between the host computer 501 and remote computer server 503, and fourth transfer 550. Thus, enhanced peripheral device functionality of removable peripheral memory storage device 502 is maintained so long as the communication and validation with the remote computer server 503 is maintained.

It would be evident to someone skilled in the art that the "user session" is optionally terminated automatically for other reasons, exemplary examples being should the elapsed time $N*\Delta t$ for example exceed a pre-prescribed limit, or the fee charged for access on a per unit time basis exceeds a credit limit on the system in question.

Optionally, the enhanced functionality includes providing user authorization data to the server to enable communications either between the remote host computer and the server or between the remote host computer and another server. When this is the case, the peripheral storage device 502 re-authenticates to the server 503 periodically to maintain the enabled communications.

Figure 6:
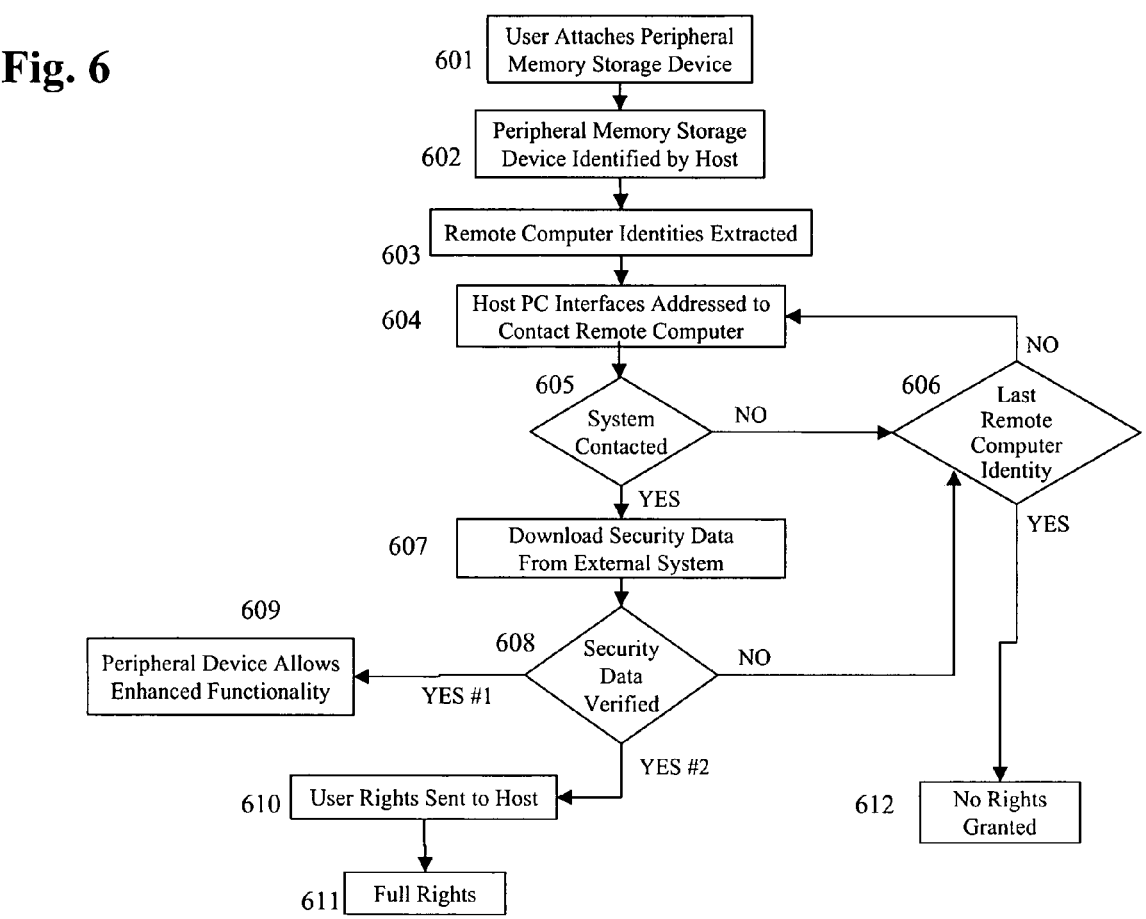
FIG. 6 outlines an exemplary flow diagram for wherein the access privileges of user are determined by the establishment of communication to remote computer and verification of security data.

Shown in FIG. 6 is an exemplary flow diagram wherein access privileges are dependent upon establishment of communications with a remote computer system and optional verification of security data.

A peripheral memory storage device is coupled to a host system in step 601. The peripheral memory storage device is identified by the host computer system, step 602, and from it a set of one or more remote computer system identities are retrieved in step 603. These identities are optionally stored within the peripheral memory storage device in a manner whereby they are secure, and further are optionally hidden from access via normal access commands of the peripheral memory storage device. These remote computer system identities are typically IP protocol sequences. Alternatively, they comprise public keys, private keys, and/or X509 certificates.

For the first identity, an attempt is made at accessing an associated remote computer system via a network interface of the host computer system in step 604. Sometimes, this requires sequential accessing of multiple network interfaces as computers are optionally coupled simultaneously to multiple direct physical networks, for example via Ethernet, Wireless interfaces, and the World Wide Web.

Should the first identified remote system not be accessible then the host computer at step 605 then the process moves to step 606 wherein the process determines if the last remote computer system identity has been retrieved. If the last remote computer system identity was not accessible then the process moves to step 612 and ends. If, however, the remote computer system identity that could not be accessed in step 606 was not the last remote computer system identity then the process returns to step 604 and addresses the next remote computer system identity within the list, and thence proceeds to step 605 again.

When an identified remote computer system is successfully contacted then a security protocol is initiated, for example, seeking verification of security data. As shown this begins with downloading security data from the contacted external system in step 607. Optionally, the peripheral memory storage device also acts to verify the remote system. For example, the applet executes within the remote system or alternatively within the peripheral memory storage device to verify integrity, security, and identity thereof. Exemplary forms of security data include user provided data, security data embedded into the peripheral memory storage device, and biometric validation of the user. Optionally, security data is required at the peripheral memory storage device in order to initiate the security protocol.

At step 608 the process determines whether the security data provided from the contacted remote computer system is valid. If the check is not valid then the process moves to step 606 and determines whether another remove computer system identity exists to contact. If the validity is confirmed then the process may proceed firstly to step 609 wherein the peripheral memory storage device is activated to provide enhanced functionality based on the validation. Alternatively, the process moves to step 610 wherein the user rights are transmitted to the remote computer system which is activated to provide functionality based on validation of the peripheral memory storage device and granted full rights in step 611. Alternatively, the security protocol involves the remote computer system providing data for provision to the peripheral memory storage device and is absent a step of validation. Further alternatively, the peripheral memory storage device performs the step of validating data received from the remote computer system.

Figure 7:
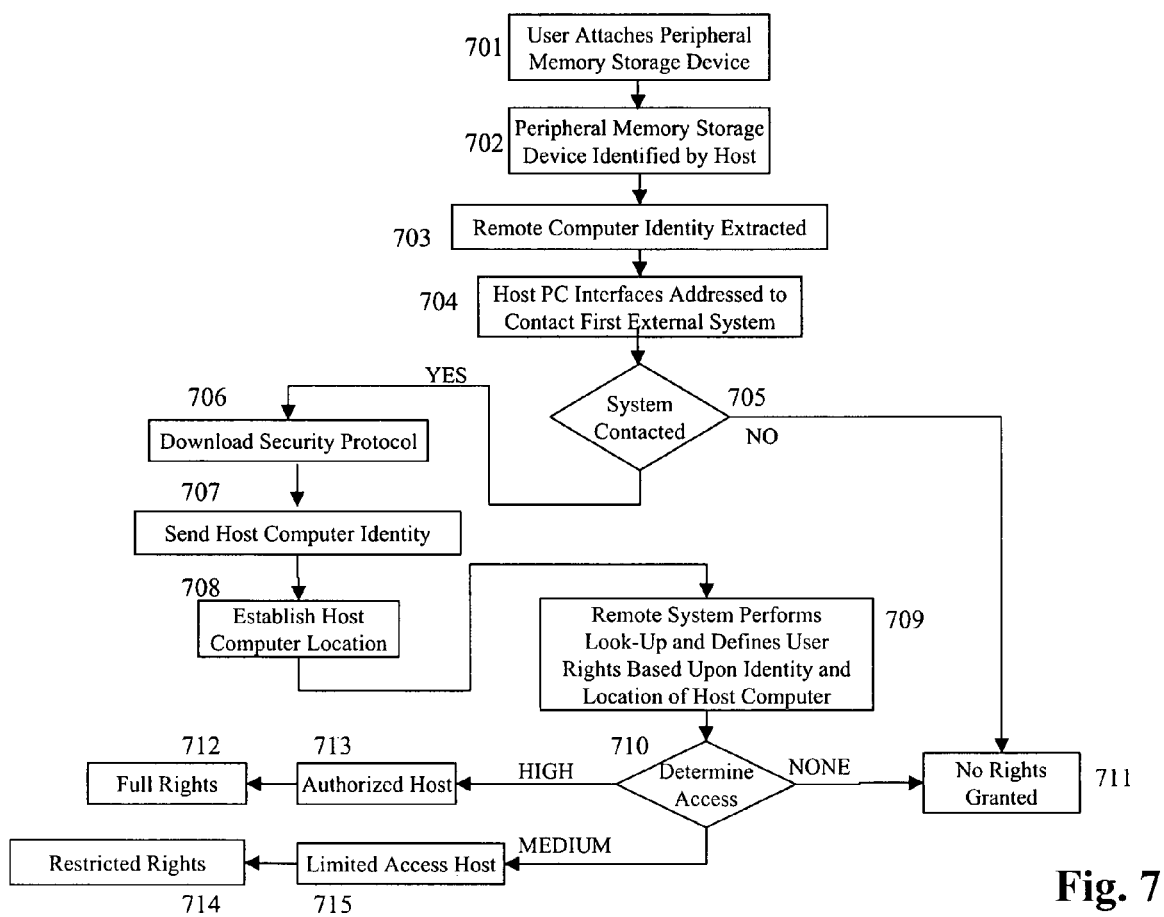

Shown in FIG. 7 is an exemplary flow diagram wherein access privileges of a user are determined by establishing communication with a remote computer system and identification of a host computer system from which the user is accessing the remote computer system.

A peripheral memory storage device is coupled to the host computer system in step 701. The peripheral memory storage device is identified by the host computer system at step 703 and a remote computer identity is extracted therefrom in step 703. This identity is optionally stored within the peripheral memory storage device in a manner whereby it is secure, and further is optionally hidden. The remote computer system identity comprises IP protocol sequences or alternatively a specific server or computer identity of a different format.

The host computer then with the identity of the remote system uses the network interfaces of the host computer system to attempt communication with said remote system at step 704. Optionally sequential accessing of multiple network interfaces is performed as sometimes computers are connected simultaneously to multiple direct physical networks as well as accessing other networks via wireless interfaces and the World Wide Web. A determination step 705 establishes whether the remote system has been contacted. If the first identified remote system is not be contacted then the user is granted no access rights in step 711. Optionally, the user may be granted limited rights rather than none.

If, however, the identified remote system is contacted then the process moves to step 705 and the remote system triggers a security protocol download and establishes secure communications between the remote system and the host system. Upon completion of the security protocol setting, the identity of the host system is communicated to the remote system in step 707. Upon receipt of the host computer identity the remote system performs a look-up operation of the host location in step 708. Based upon the location the process looks-up against an active rights matrix the host location identified and determines the user's rights in step 710.

These user rights are then communicated back to the host computer, wherein they may be stored locally on the host or within the peripheral memory storage device. Shown in the exemplary embodiment are three user rights levels granted by the remote system to the user attached to the host. The first of these is "NONE" wherein user is granted no rights, examples of such look-ups based upon location including, but not limited to, determining access being made from networks hosted in countries which the user's corporation considers insecure, or has routed via a network known to be insecure. Accordingly the process moves to step 711.

The second of these being "MEDIUM" wherein the user is granted limited access to the host in step 715 and restricted rights in step 714. Such restricted rights might be applied for a user accessing a system not part of the corporate physical infrastructure and hence the user is granted, for example, access to email services, but is prevented from accessing corporate databases.

The third exemplary rights granted are "HIGH" wherein the user is given authorization to the host in step 713 and is granted full rights in step 712. Here examples of look-ups resulting in "HIGH" include the user accessing a corporate headquarters remote system from a branch office of the corporation. It would be understood to one skilled in the art that there are numerous degrees of access rights that could be granted to a user, both as broad privileges, but also wherein the rights are varied according to the applications accessible by the user.

Figure 8:
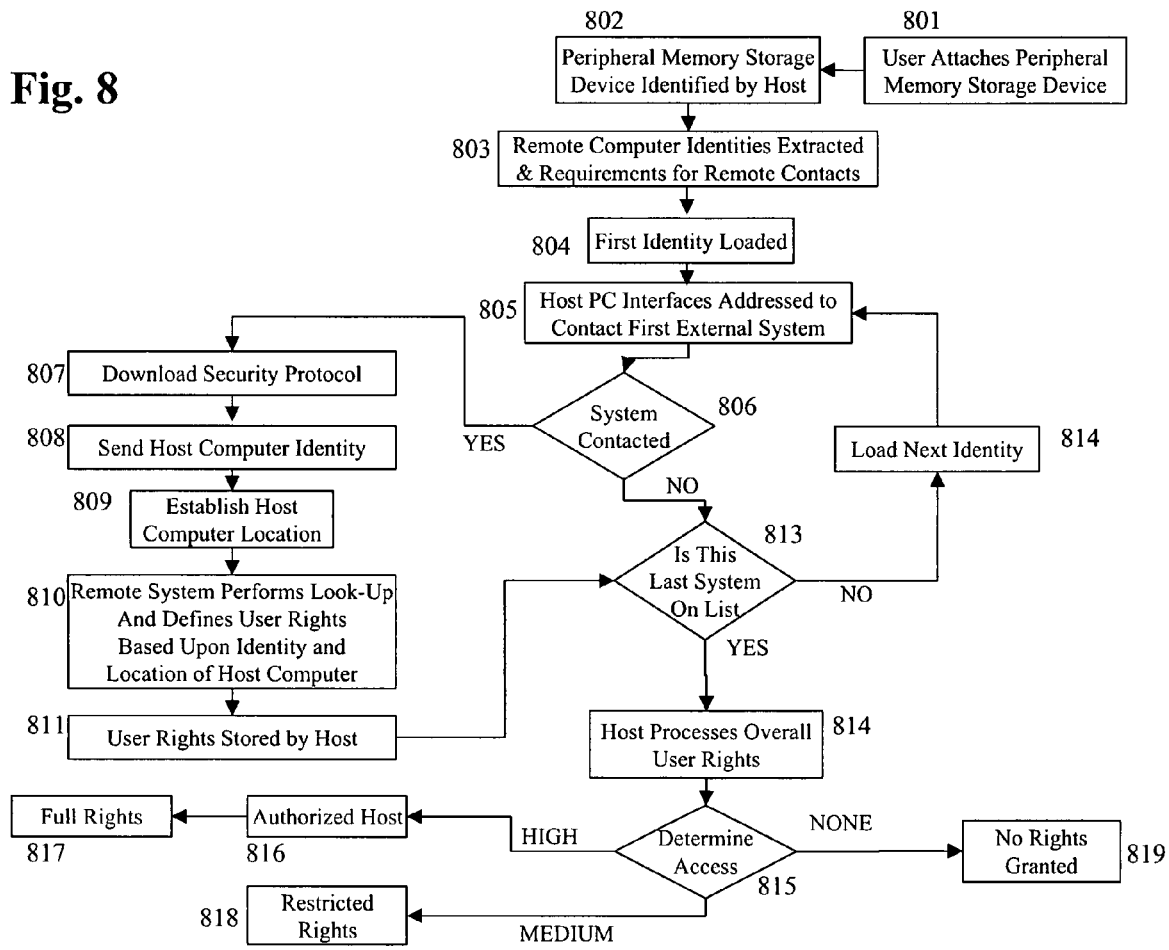
FIG. 8 outlines an exemplary flow diagram for wherein the access privileges of user are determined by the establishment of communication to remote computer systems and the establishment of rights from the remote computer systems based upon the identity of the host system.

Shown in FIG. 8 is an exemplary flow diagram for wherein the access privileges of a user are determined by the establishment of communication to remote computer systems and the establishment of rights from the remote computer systems based upon the identity of the host system.

As a first step in the exemplary process a peripheral memory storage device is coupled to the host system in step 801. The peripheral memory storage device is identified by the host computer system at step 802, and from it a set of remote computer identities are extracted, along with requirements for remote system contacts in step 803. These identities are optionally stored within the peripheral memory storage device in a manner whereby they are secure, and further are optionally hidden from normal accessing of the peripheral memory storage device. These remote computer system identities are typically IP protocol sequences, but optionally are specific servers or computer identities of a different format.

The host computer uses the network interfaces of the host computer system to attempt communication with the first remote system identity from the remote system identities list at step 806. This optionally involves the sequential accessing of multiple network interfaces as computers are sometimes connected to multiple networks both directly and indirectly. At step 807 the process determines whether the remote system has been contacted or not. Should the first identified remote system not be contacted then the host proceeds to step 813 to determine if the remote system identity currently employed is the last within the extracted set of remote computer identities. If it is not then the process moves to step 814 wherein the next identity is loaded and the process now returns to step 805 and repeats the attempt to contact a remote host with the next remote system identity.

If, however, the identified remote system is contacted then the process moves to step 807 the remote system triggers a security protocol download and establishes secure communications between the remote system and the host system. Upon completion of the security protocol setting then the identity of the host system is communicated to the remote system in step 808. Upon receipt of the host computer identity the remote system performs a look-up operation of the host location in step 809. This location is then compared against an active rights matrix that establishes the user's rights in step 810. These rights are then sent to the host computer and temporarily stored either local to the host computer or on the peripheral memory storage device at step 811. The process now moves to step 813 to determine whether any other remote systems remain to be contacted. Upon determining that more identities exist the process loops back via step 814 as discussed supra.

If a further remote system is not required then the flow jumps directly to defining overall access rights at step 814. The result of the preceding process flow being to sequentially attempt contact with all remote computers within the set of identities extracted and establishing for each successful contact the rights associated with each. Establishing the overall user rights within this exemplary embodiment is looking for the remote system providing the highest access privileges and thereby allowing the user to work in communication solely with this remote system. Alternatively the establishing of rights may be made by taking multiple privileges such that different remote systems are accessed according to application or activity. Optionally the user may require multiple high level user rights before they can access one or more remote systems.

Shown in the exemplary embodiment are three user rights levels granted to the user attached to the host determined from the step 815. The first of these is "NONE" wherein user is granted no rights and the process moves to step 819 and terminates. The second being "MEDIUM" wherein the user is granted restricted rights in step 818, and finally the third exemplary rights granted are "HIGH" wherein the user is given full rights 817 having established an authorized host at step 816. It would be understood to one skilled in the art that there are numerous degrees of access rights that could be granted to a user, both as broad privileges, but also wherein the rights are varied according to the applications accessible by the user.

Figure 9:
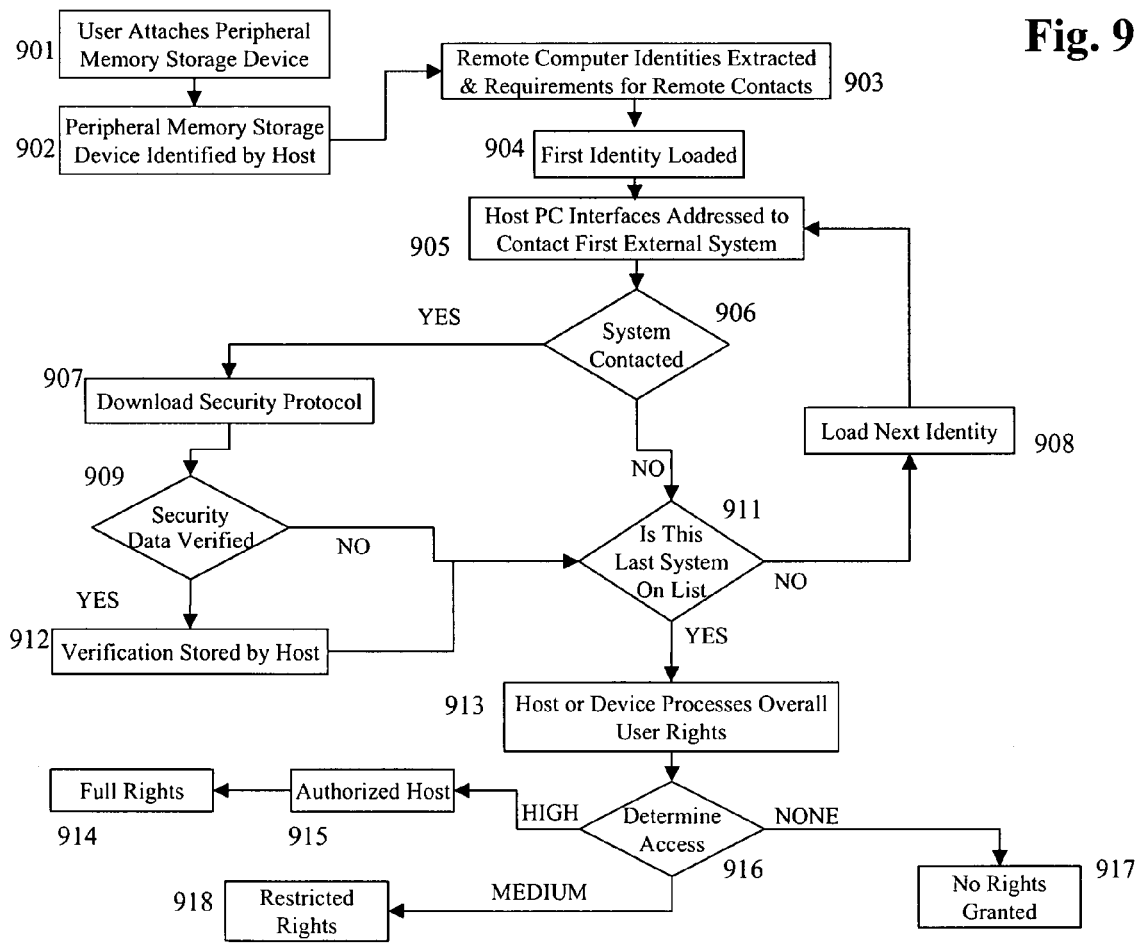
FIG. 9 outlines an exemplary flow diagram for wherein the access privileges of user are determined by the establishment of communication to remote computer systems and the verification of security data with said remote computer(s).

Shown in FIG. 9 is an exemplary flow diagram for wherein the access privileges of user are determined by the establishment of communication to remote computer systems and the verification of security data with said remote computer(s).

As a first step 901 in the exemplary process a peripheral memory storage device is coupled to the host system. The peripheral memory storage device is identified at step 902 by the host computer system, and from it a set of remote computer identities are extracted, along with requirements for remote system contacts at step 904. These identities are optionally stored within the peripheral memory storage device in a manner whereby they are secure, and are optionally hidden from normal accessing of the peripheral memory storage device.

The host computer then takes the first remote system identity in step 904 from the remote system identities list and uses the network interfaces of the host computer system to attempt communication with said remote system in step 905. Of course, once the applet is in execution on the host system, it is able to monitor host system activity through process 906 and, as such, when a user of the host system accesses a server, the applet optionally automatically detects the access attempt and then establishes a secure communication channel by downloading a security protocol in step 908 and verifying security data in step 909. If the verification in step 909 is accepted then this verification is stored by the host in process 912 and the flow proceeds to step 911. If the verification of step 909 fails then the process would move directly to step 911. Failure to detect the successful contact in process 906 would also move the process directly to step 911.

In step 911 the process determines whether additional remote computer system identities exist to contact. If the determination is yes then the process moves to step 908, loads the next identity and returns to step 905 to attempt contact with this next system. If the process determines that no other identities remain to be contacted then the process moves to step 913 and determines the overall rights. It would be apparent that the above process loop allows the process to store successful verification data for each contacted remote system.

At this point, step 913, the overall user rights are established based upon the security verifications completed and the requirements loaded from the peripheral memory storage device. As outlined supra this could be as simple as achieving security verification with a single remote system, or as complicated as requiring security verification with all remote systems in the identity list loaded from the peripheral memory storage device. Optionally, the verification of each remote system is required for a different application for the user and, as such is optionally performed independently one of another.

Shown in the exemplary embodiment are three user rights levels granted to the user attached to the host, being determined in step 916 from the result of prior process step 913. The first of these is "NONE" wherein user is granted no rights wherein the process moves to step 917 and terminates. The second path being "MEDIUM" wherein the user is granted restricted rights in process step 918. Finally the third exemplary rights granted are "HIGH" wherein host is authorized in step 915 and the user is given full rights in step 916. It would be understood to one skilled in the art that there are numerous degrees of access rights that could be granted to a user, both as broad privileges, but also wherein the rights are varied according to the applications accessible by the user. Alternatively, access privileges are stored securely within the peripheral memory storage device and form objects or functions accessible from within the peripheral memory storage device once authenticated to a server.

Figure 10:
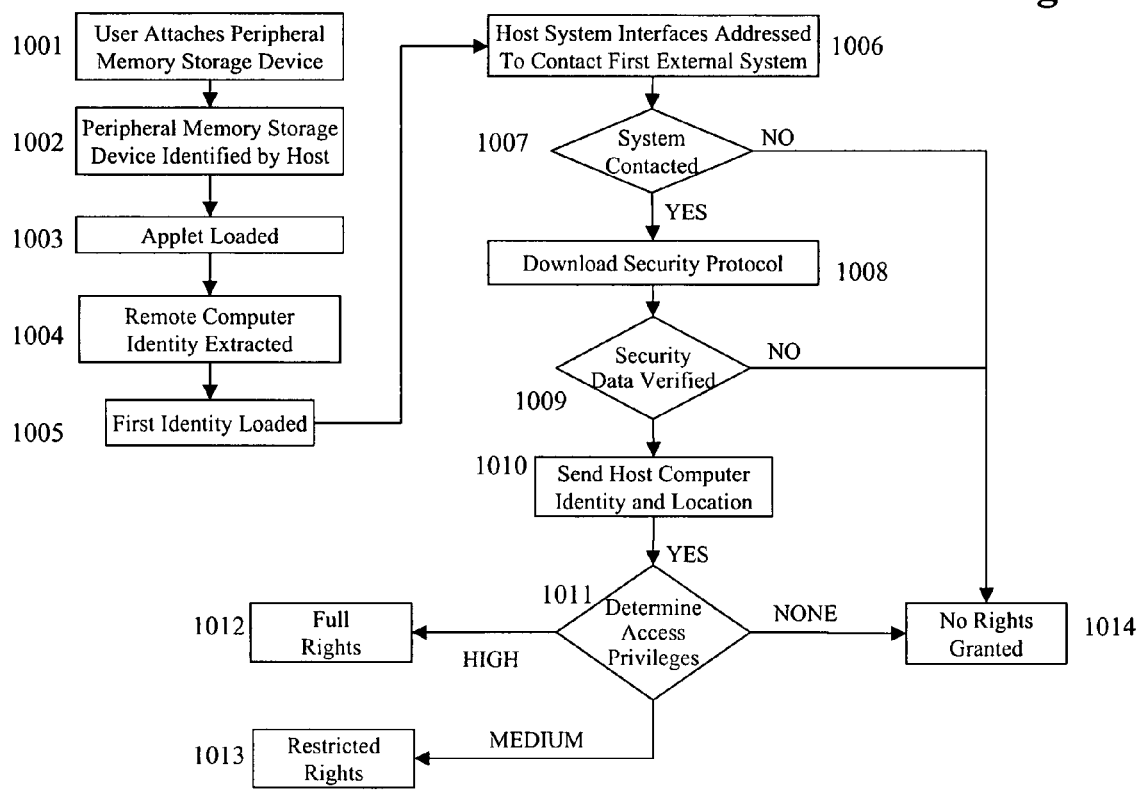
FIG. 10 outlines an exemplary flow diagram for wherein the access privileges of user are established via an applet loaded for establishing communication to remote computer systems and the verification of security data.

Shown in FIG. 10 is an exemplary flow diagram for wherein the access privileges of user are established via an applet loaded for establishing communication to remote computer systems and the verification of security data.

A peripheral memory storage device is coupled to the host system in step 1001. The peripheral memory storage device and host system identify each other at step 1002. This interchange triggers an applet to be loaded in step 1003, either onto the host system or internally, to the peripheral memory storage device. Examples of potential applications for internally running the applet could include the connection of a USB memory stick to a mobile telephone for the transfer of video, text documents or photographs, an MP3 player to a mobile telephone for downloading music, or even a digital camera to a telephone to provide video conferencing. Many other applications exist for such interfacing of electronic devices together wherein one provides a network interface.

Once loaded the applet causes a remote computer identity to be loaded, step 1004, from the peripheral memory storage device. The remote computer identity is optionally stored within non-volatile memory of the peripheral memory storage device in a manner whereby it is secure, and further is optionally hidden from normal accessing of the peripheral memory storage device. This remote system identity is loaded in step 1005 and then used by the applet in accessing the network interfaces of the host system to attempt communication with said remote system at step 1006.

Should the identified remote system not be contacted, as determined in step 1007, then the process moves to step 1014, wherein no rights are granted and the process terminates. If, however, the identified remote system is contacted then process moves to step 1008 and the remote system triggers a security protocol download thereby establishing secure communications between the remote system and the host system. Alternatively, secure communication is established between the remote system and the device. Upon completion of the security protocol then a security verification step is undertaken at step 1009. This verification could for example include the user providing said security data, extraction of security data embedded into the peripheral memory storage device, and even biometric validation of the user. If verification is not completed the process moves to step 1012 and terminates. If verification is however completed successfully then this fact is stored by the host computer and user access privileges established from the remote system. Alternatively, instead of access privileges being provided from a server, the device has the access privileges stored internal thereto in a secure fashion and, upon authentication, provides and enforces the access privileges locally. Within this exemplary process flow the successful verification results in the process moving forward to step 1010 and the host computer identity and location being sent to the remote system, wherein the access privileges are determined in step 1011.

Shown in the exemplary embodiment are three user rights levels granted to the user. The first of these is "NONE" wherein user is granted no rights such that the process flow moves from step 1011 to step 1012 and terminates. The second rights level being "MEDIUM" wherein the user is granted restricted rights at step 1013, and finally the third exemplary rights granted are "HIGH" wherein the user is given full rights in step 1012. It would be understood to one skilled in the art that there are numerous degrees of access rights that could be granted to a user, both as broad privileges, but also wherein the rights are varied according to the applications accessible by the user.

Figure 11:
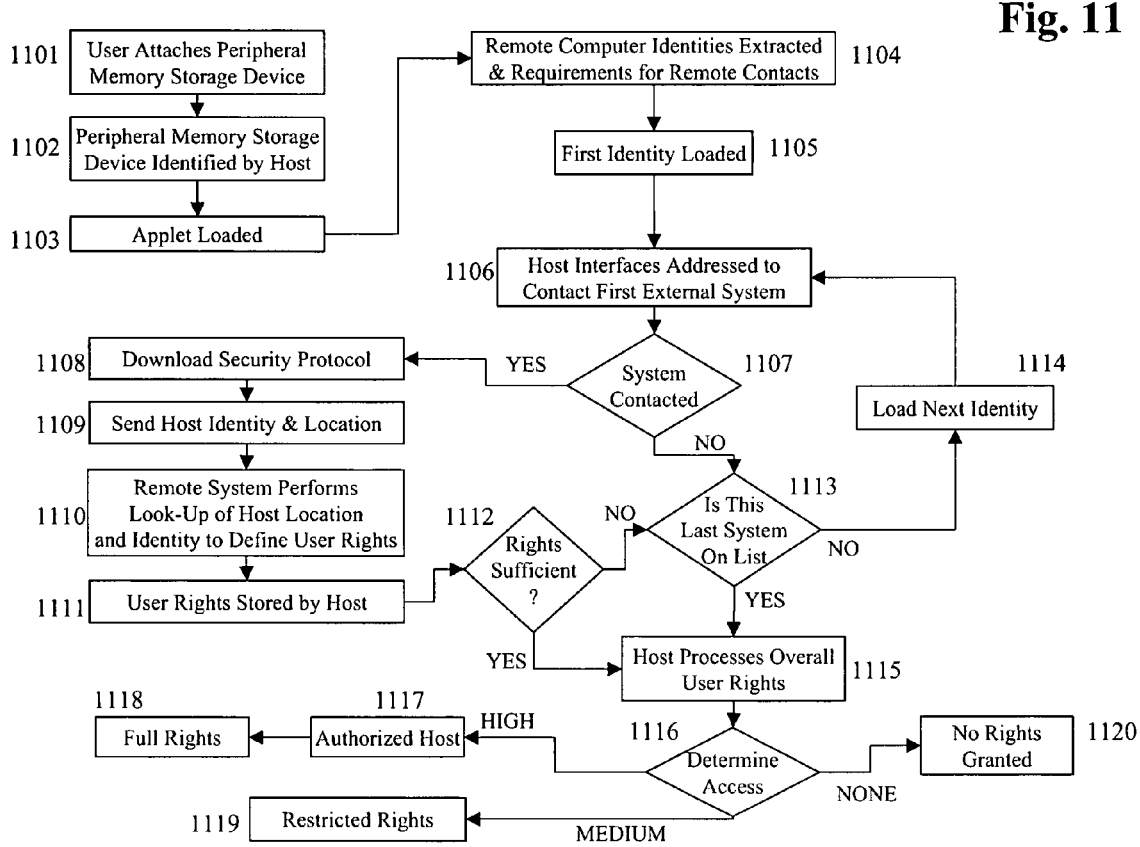

Shown in FIG. 11 is a simplified flow diagram wherein access privileges of user are established via an applet loaded for establishing communication to remote computer systems and the identity of the host computer.

A peripheral memory storage device is coupled to the host system at step 1101. The peripheral memory storage device and host system identify each other in step 1102. This interchange triggers an applet to be executed at step 1103, either onto the host system or internally to the peripheral memory storage device. Examples of potential applications for internally running the applet could include the connection of a USB memory stick to a mobile telephone for the transfer of video, text documents or photographs, an MP3 player to a mobile telephone for downloading music, or even a digital camera to a telephone to provide video conferencing. Many other applications exist for such interfacing of electronic devices together wherein one provides a network interface.

Once loaded the applet causes a set of remote computer identities to be loaded in step 1104, where these are optionally temporarily stored within the host system or the peripheral memory storage device. The remote computer identities are optionally stored for long-term use within the peripheral memory storage device in a manner whereby they are secure, and further are optionally hidden from normal accessing of the peripheral memory storage device. The first remote system identity is loaded in step 1105 and used by the applet in accessing the network interfaces of the host system to attempt communication with said remote system at step 1106.

Should the first identified remote system not be contacted then the host now moves to step 1113 and returns to the extracted list of system identities to determine whether the identity attempted is the last in the list. If not, then the next identity is extracted in step 1114, and the host computer repeats the attempt to contact a remote host with the next remote system identity back at step 1106. If, however, the identified remote system is contacted then the remote system moves forward to step 1108 and triggers a security protocol download, thereby establishing secure communications between the remote system and the host system.

Upon completion of the security protocol setting, the identity of the host system and location are communicated to the remote system at step 1109. Upon receipt of the host computer identity the remote system performs a look-up operation of the host location against the active rights matrix and establishes the user's rights in step 1110. These rights are then sent to the host computer and temporarily stored either local to the host computer or on the peripheral memory storage device at step 1111.

The host computer now decides in step 1112, using the requirements previously loaded from the peripheral memory storage device in step 1104 whether it is necessary to contact a further remote system. If it is the process moves to step 1114 and determines whether a further remote system identity exists. This process loop, when each next remote system is contacted and communications established then a further set of user rights are transferred to the host computer and similarly stored with the previous set or sets in step 1111.

The host computer continues through the list of computer identities until either the requirements for remote system contact have been met as determined in step 1112 or all remote system identities in the list have been processed and communication attempts completed. In either case the process moves to step 1115 and at this point the overall user rights are established. As with previous exemplary embodiments the establishment of the overall rights may be as simple as looking for the remote system providing the highest access privileges and thereby allowing the user to work in communication solely with this remote system, or by taking multiple privileges such that different remote systems are accessed according to application or activity. It is also feasible that for example multiple high level user rights might be required before the user can access one or more remote systems. The process then moves to step 1116 with the overall rights and determines the access.

Shown in the exemplary embodiment are three user rights levels granted to the user attached to the host. The first of these is "NONE" wherein the process moves to step 1120 and the user is granted no rights. The second being "MEDIUM" wherein the process moves to step 1119 and the user is granted restricted rights. Finally the third exemplary rights granted are "HIGH" wherein the process proceeds to step 1117 with the host being authorized and the user being given full rights in step 1118. It would be understood to one skilled in the art that there are numerous degrees of access rights that could be granted to a user, both as broad privileges, but also wherein the rights are varied according to the applications accessible by the user.

Figure 12:
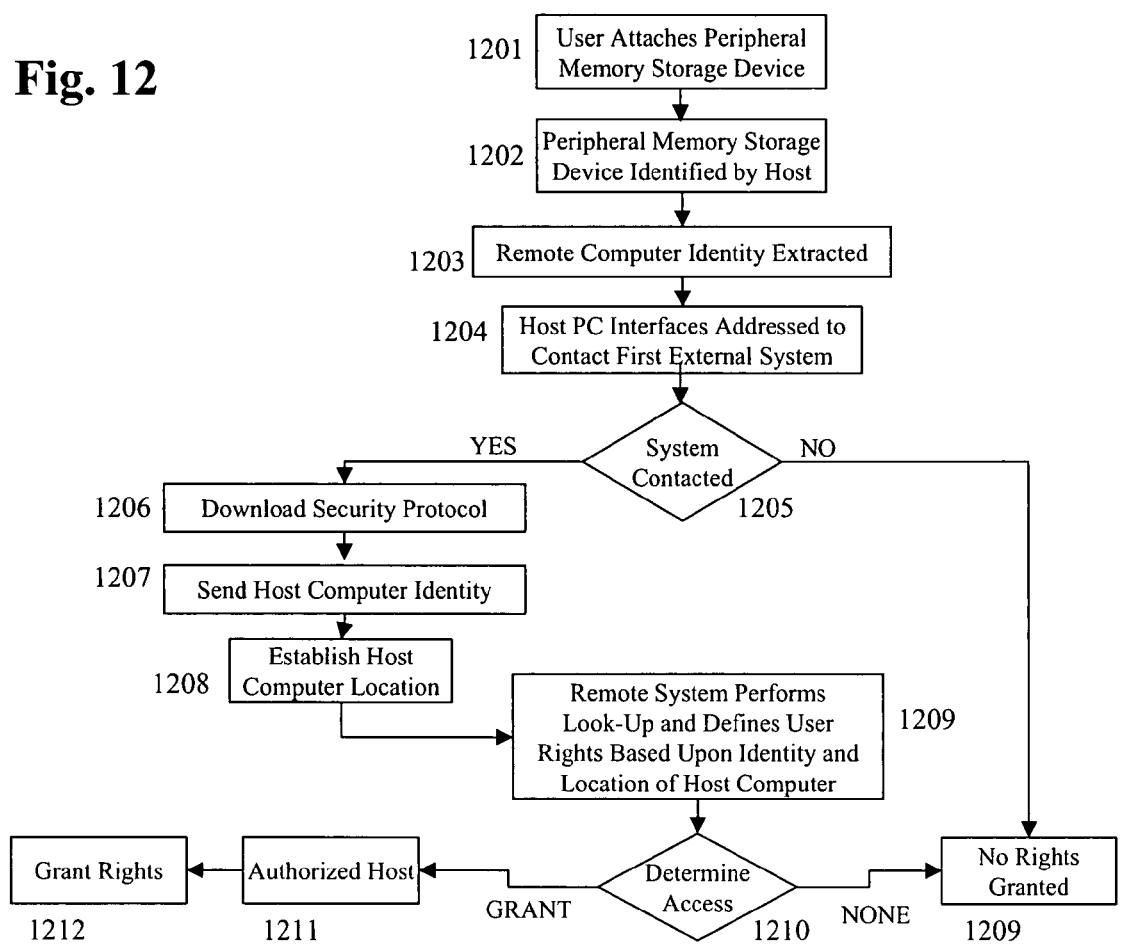
FIG. 12 outlines an exemplary flow diagram for wherein the access of a user is determined by the establishment of communication to remote computer system.

Shown in FIG. 12 is an exemplary flow diagram wherein access of a user is determined by establishing communication with a remote computer system and identification of a host computer system from which the user is accessing the remote computer system.

A peripheral memory storage device is coupled to the host computer system in first step 1201, wherein the peripheral memory storage device is identified by the host computer system in step 1202 and a remote computer identity is extracted therefrom at step 1203. This identity is optionally stored within the peripheral memory storage device in a manner whereby it is secure, and further is optionally hidden. The remote computer system identity comprises IP protocol sequences or alternatively a specific server or computer identity of a different format.

The host computer then with the identity of the remote system uses the network interfaces of the host computer system to attempt communication with said remote system in step 1204. Optionally sequential accessing of multiple network interfaces is performed as sometimes computers are connected simultaneously to multiple direct physical networks as well as accessing other networks via wireless interfaces and the World Wide Web. If the identified remote system not be contacted, as determined at decision process 1205, then the user is granted limited or no access rights as the process moves to step 1209 and terminates.

If, however, the identified remote system is contacted then the remote system triggers a security protocol download at step 1206 and establishes secure communications between the remote system and the host system. Upon completion of the security protocol setting, the identity of the host system is communicated to the remote system in step 1207 and the host location established in step 1208 whereupon the remote system performs a look-up operation of the host location against the active rights matrix and establishes the communication rights in step 1209.

The determined access rights are used in process step 1210 to establish the user rights. As shown within the exemplary process flow two rights levels are available. The first of these being "NONE" wherein no rights are granted and the process moves to step 1209. The second rights level being "GRANT" wherein the host computer is authorized at step 1211 by the remote system and then user is granted full rights in step 1212. These rights are then supported in communication between the host computer and remote computer. Alternatively the remote computer may establish these rights for communications between the host computer and a known remote server, wherein the known remote server is remote to both the host and remote computers.

Though several of the embodiments described herein involve a list of remote computers, they are also applicable to situations involving remote servers, remote gateways, and wherein only a single entity is identified for remote access or a plurality of entities identified.

Though the embodiments described herein involve a computer for communication with the host system and another remote computer for communication with the peripheral memory storage device, these computers are optionally one and the same system. Thus, either the peripheral memory storage device accesses prior to the host system being provided access thereto or when the host system attempts to access the peripheral memory storage device negotiates a secure connection therewith prior to providing the host system access to the server. For example a web site associated with an on-line financial institution must first be trusted by the peripheral memory storage device before the peripheral memory storage device releases information to it. Without such trust establishment the peripheral memory storage device functionality is limited and does not allow for example account information to be transmitted to the remote system. Of course, where information within the peripheral memory storage device is required for secure communication with the web site, a lack of "trust" results in a failed communication attempt. Effectively, this limits an effectiveness of many forms of intrusion including some types of phishing, some types of Trojans, and many other forms of hacking.

The exemplary embodiments described above are also implementable using tokens, dongles, and smartcards which along with peripheral memory storage devices are referred to herein and in the claims that follow as removable security devices. Numerous other embodiments may be envisaged without departing from the spirit or scope of the invention.

What is claimed is:

1. A method comprising:
providing a first system in communication with a first network;
providing a removable security device having therein a first security process to the first system;
accessing a first remote system from the first system for communication therewith;
in response to accessing the first remote system, initiating an access process for accessing a second remote system by at least one of an applet in execution within the first system communicating with the removable security device and the removable security device, the second remote system accessible via at least one of the first network and a second other network, the second remote system other than the first remote system; and
subsequent to initiating the access process, performing a second security process for controlling use of the first security process, the second security process comprising:
when the second remote system is other than accessed by the access process, preventing secure communication between the first system and the first remote system according to the first security process; and
when the second remote system is accessed by the access process, performing the first security process in dependence of at least the address of the first remote system to authenticate the removable security device to the first remote system, the first remote system then transmitting data to the first system to establish secure communications between the first system and the first remote system.

2. A method according to claim 1 wherein the first system comprises a wireless communications device.

3. A method according to claim 1 wherein an identifier relating to the first system for use within the first security process is stored within the removable security device.

4. A method according to claim 1 wherein the first security process comprises an authorization process for at least one of authorizing the removable security device to the first system and authenticating the first remote system as a trusted remote system.

5. A method according to claim 4 wherein the authorization process comprises at least one of generating a one time password, receiving a code from the first remote system and generating a one time password in dependence upon the code, and providing a user authentication to the removable security device.

6. A method according to claim 4 wherein the authorization process comprises at least one of providing user identification data and user authorization data from the removable security device to the first remote system and providing authorization data stored in a secure fashion within the removable security device to the first remote system by transmitting therefrom in an obfuscated fashion for preventing deciphering thereof.

7. A method according to claim 1 wherein the removable security device comprises at least one of a USB flash memory storage device, a peripheral memory storage device and a flash memory device.

8. A method according to claim 1 wherein the first remote system and the second remote system are at least one of different remote systems and first and second predetermined portions of a multiprocessor remote system.

9. A method according to claim 1 wherein the first security process comprises an authorization process for authorizing the removable security device to the second remote system.

10. A method according to claim 1 wherein the transmitted data is provided to at least two of the second remote system, the first remote system, and another remote system, the address of the another remote system being stored within the removable security device.

11. A method according to claim 1 wherein accessing of the first remote system comprises retrieving security data therefrom, the security data for use in enabling the first security process.

12. A method according to claim 1 wherein the first security process is for execution within the removable security device and operates on at least some data stored within the removable security device and inaccessible from the removable security device by the first system.

13. A method according to claim 1 wherein the first remote system is one of a plurality of predetermined first remote systems.

14. A method according to claim 13 wherein the first security process is enabled differently depending upon which of the plurality of predetermined first remote systems is accessible.

15. A method according to claim 1 wherein accessing the first remote system is performed by at least one of the first system and the security device via a network interface of the first system.

16. A method according to claim 1 wherein stored within the security device is an applet for accessing the first remote system, the applet for execution at least one of on the first system when loaded in response to coupling of the removable security device therewith and solely within the removable security device.

17. A method according to claim 16 wherein the applet for execution at least on the first system is other than stored in a non-volatile fashion within the first system.

18. A method according to claim 16 wherein execution of the applet controls at least one of the overall process of accessing the first remote system and accessing information stored within the security device that is inaccessible from the security device by the first system otherwise.

19. A method according to claim 18 wherein accessing information comprises accessing information relating to at least one of an identity of the first remote system, establishing encrypted communications with the first remote system, and verifying at least one of a user identity and the first remote system.

20. A method according to claim 1 wherein the first security process comprises communicating an identity of the first system to the first remote system.

21. A method according to claim 20 further comprising:
receiving security data from the remote system at the first system, wherein the first security process is enabled differently depending on the security data.

22. A method according to claim 21 wherein the security data is determined in dependence upon at least one of a first system identity communicated to the first remote system, a determined location of the first system, and routing information relating to the information transferred from the first system to the first remote system.

23. A method according to claim 21 further comprising:
determining access privileges to at least one of data and processes within the security device, the access privileges determined at least in dependence of the security data.

24. A method according to claim 1 wherein the first security process comprises at least one of validating a user identity, validating a user identity based upon a biometric sample, and validating a user based upon security information retrieved from the security device prior to enabling the first security process.

25. A method comprising:
providing a first system in communication with a network;
providing a security device having therein a first security process to the first system;
accessing a first remote system from the first system for communication therewith;
in response to accessing the first remote system, initiating an access process for accessing a second remote system by at least one of the security device and an applet in execution within the first system and communicating with the security device, the second remote system accessible via the network, the second remote system other than the first remote system; and
subsequent to initiating the access process, performing a second security process for controlling use of the first security process, the second security process comprising:
when the second remote system is other than accessed by the access process, preventing use of the first security process for preventing secure communication between the first system and the first remote system according to the first security process; and
when the second remote system is accessed by the access process, performing the first security process relating to the address of the first remote system to authenticate the security device to the first remote system, the first remote system then transmitting data the first system to establish secure communications between the first system and the first remote system.

26. A method according to claim 25 wherein the first system comprises a wireless communications device.

27. A method according to claim 25 wherein the first remote system and the first system are at least one of different systems and first and second predetermined portions of a single system respectively.

28. A method according to claim 25 comprising:
providing a first remote system identifier, the first remote system identifier stored within the security device.

29. A method according to claim 25 wherein performing the first security process comprises providing a user security process for authorizing the security device to the first remote system.

30. A method according to claim 25 wherein transmitting the data comprises transmitting the data to both the first system and the remote system.

31. A method according to claim 25 wherein accessing the first remote system comprises retrieving security data therefrom, the security data for use in enabling the first security process.

32. A method according to claim 25 wherein the first security process is for execution within the security device and operates on at least some data stored within the security device and inaccessible from the security device by the first computer system.

33. A method according to claim 25 wherein the first remote system is one of a plurality of predetermined first remote systems.

34. A method according to claim 33 wherein the first security process is enabled differently depending upon at least one of the plurality of predetermined first remote systems being accessible.

35. A method according to claim 25 wherein accessing the first remote system is performed by at least one of the security device and the first system via a network interface of said first system.

36. A method according to claim 25 wherein stored within the security device is an applet for accessing the first remote system, the applet for execution on at least one of the first system and being loaded in response to a coupling of the security device therewith and the security device.

37. A method according to claim 36 wherein the applet is at least one of: for being other than stored in a non-volatile fashion within the first system when for execution thereon; for controlling the overall process of accessing the first remote system; and for accessing information stored within the removable security device that is inaccessible from the security device by the first system otherwise.

38. A method according to claim 37 wherein accessing information comprises accessing information relating to at least one of an identity of the first remote system, establishing encrypted communications with the first remote system, and verifying at least one of the user identity and the first remote system.

39. A method according to claim 25 wherein the first security process includes the communication of a first system identity to the first remote system.

40. A method according to claim 39 comprising:
receiving security data from the remote system at the first system, wherein the first security process is enabled differently depending on the security data.

41. A method according to claim 40 wherein receiving security data comprises receiving security data generated in dependence upon at least one of the first system identity communicated to the first remote system, a determined location of the first system, and routing information relating to information transferred from the first system to the first remote system.

42. A method according to claim 40 further comprising:
determining at least an access privilege to at least one of data and processes within the security device in dependence upon the security data.

43. A method according to claim 25 wherein the first security process comprises an authorization process for at least one of authorizing the security device to the first system and authenticating the first remote system as a trusted remote system.

44. A method according to claim 43 wherein the authorization process comprises at least one of generating a one time password, receiving a code from the first remote system and generating a one time password in dependence upon the code, and providing a user authentication to the security device.

45. A method according to claim 43 wherein the authorization process comprises at least one of providing user identification data and user authorization data from the security device to the first remote system and providing authorization data stored in a secure fashion within the security device to the first remote system by transmitting therefrom in an obfuscated fashion for preventing deciphering thereof.

46. A method according to claim 25 wherein the removable security device comprises at least one of a USB flash memory storage device, a peripheral memory storage device and a flash memory device.

47. A method according to claim 25 wherein the first security process comprises an authorization process for authorizing the removable security device to the second remote system.

48. A method according to claim 25 wherein the first security process comprises communicating an identity of the first system to the first remote system.

49. A method according to claim 48 further comprising:
receiving security data from the remote system at the first system, wherein the first security process is enabled differently depending on the security data.

50. A method according to claim 49 wherein the security data is determined in dependence upon at least one of a first system identity communicated to the first remote system, a determined location of the first system, and routing information relating to the information transferred from the first system to the first remote system.

51. A method according to claim 49 further comprising:
determining access privileges to at least one of data and processes within the security device, the access privileges determined at least in dependence of the security data.

52. A method according to claim 25 wherein the first security process comprises at least one of validating a user identity, validating a user identity based upon a biometric sample, and validating a user based upon security information retrieved from the security device prior to enabling the first security process.

* * * * *